United States Patent
Slagel

(10) Patent No.: US 10,626,629 B2
(45) Date of Patent: *Apr. 21, 2020

(54) PORTABLE ACCESS CONTROL SYSTEM

(71) Applicant: MODULAR SECURITY SYSTEMS, INC., Ironton, OH (US)

(72) Inventor: Robert Rhett Slagel, Ironton, OH (US)

(73) Assignee: MODULAR SECURITY SYSTEMS, INC., Ironton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/170,810

(22) Filed: Oct. 25, 2018

(65) Prior Publication Data

US 2019/0128001 A1    May 2, 2019

Related U.S. Application Data

(63) Continuation of application No. 15/621,517, filed on Jun. 13, 2017, now Pat. No. 10,138,642, which is a
(Continued)

(51) Int. Cl.
*E04H 14/00* (2006.01)
*E04H 1/12* (2006.01)
(Continued)

(52) U.S. Cl.
CPC .............. *E04H 1/1227* (2013.01); *E04H 1/00* (2013.01); *E04H 1/005* (2013.01); *E04H 1/1205* (2013.01); *E04H 3/00* (2013.01); *E04H 3/08* (2013.01); *E05F 15/70* (2015.01); *E05F 15/76* (2015.01); *E06B 11/08* (2013.01); *G01V 5/0008* (2013.01); *G07C 9/00007* (2013.01); *E04H 2001/1283* (2013.01); *E05F 2015/765* (2015.01); *G07C 2009/0092* (2013.01)

(58) Field of Classification Search
CPC ......... E04H 1/1227; E04H 3/00; E04H 1/005; E04H 3/08; E04H 1/1205; E04H 1/00; E04H 2001/1283; E05F 15/70; E05F 15/76; E05F 2015/765; G07C 9/00007; G07C 2009/0092; G01V 5/008; E06B 11/08
USPC .............................................. 52/1, 79.1, 79.8
See application file for complete search history.

(56) References Cited

U.S. PATENT DOCUMENTS

| 1,253,964 A | 1/1918 | Hack |
| 2,309,437 A | 1/1943 | Cady |

(Continued)

FOREIGN PATENT DOCUMENTS

| BE | 1009435 | 3/1997 |
| CA | 2 303 611 | 10/2000 |

(Continued)

OTHER PUBLICATIONS

U.S. Appl. No. 11/733,464, filed Apr. 1, 2007, Slagel.
(Continued)

*Primary Examiner* — Basil S Katcheves
(74) *Attorney, Agent, or Firm* — DLA Piper LLP (US)

(57) ABSTRACT

A portable container is provided which comprises a passing room(s) allowing entry into a second area into a first area, the passing room having at least two openings with a walkway in-between. Barrier device(s) can be located in the walkway but not connected to the first or second opening. A control room(s) can also be provided, the control room being connected to the passing room(s).

21 Claims, 5 Drawing Sheets

Related U.S. Application Data continuation of application No. 15/192,344, filed on Jun. 24, 2016, now abandoned, which is a continuation of application No. 14/735,130, filed on Jun. 9, 2015, now Pat. No. 9,404,278, which is a continuation of application No. 14/157,011, filed on Jan. 16, 2014, now Pat. No. 9,051,748, which is a continuation of application No. 13/205,419, filed on Aug. 8, 2011, now Pat. No. 8,671,624, which is a continuation of application No. 12/818,899, filed on Jun. 18, 2010, now Pat. No. 8,015,754, which is a continuation of application No. 10/992,126, filed on Nov. 19, 2004, now Pat. No. 7,762,025.

(51) Int. Cl.

| | | |
|---|---|---|
| E05F 15/76 | (2015.01) | |
| G07C 9/00 | (2020.01) | |
| G01V 5/00 | (2006.01) | |
| E04H 1/00 | (2006.01) | |
| E04H 3/00 | (2006.01) | |
| E06B 11/08 | (2006.01) | |
| E04H 3/08 | (2006.01) | |
| E05F 15/70 | (2015.01) | |
| E05F 15/73 | (2015.01) | |

(56) References Cited

U.S. PATENT DOCUMENTS

| | | |
|---|---|---|
| 3,482,037 A | 12/1969 | Brown et al. |
| 3,492,767 A | 2/1970 | Pincus |
| 4,308,803 A | 1/1982 | Pretini |
| 4,385,469 A | 5/1983 | Scheuerpflug et al. |
| 4,480,863 A | 11/1984 | Hormann |
| 4,481,887 A | 11/1984 | Urbano |
| 4,513,545 A | 4/1985 | Hopkins, Jr. |
| 4,586,441 A | 5/1986 | Zekich |
| 4,656,954 A | 4/1987 | Tonali |
| 4,683,688 A | 8/1987 | Wojcinski |
| 5,353,558 A | 10/1994 | Shea, Sr. et al. |
| 5,542,211 A | 8/1996 | Colombo |
| 5,579,613 A | 12/1996 | Carr |
| 5,617,674 A | 4/1997 | Terrill |
| 5,676,271 A | 10/1997 | Reynard |
| 5,704,163 A | 1/1998 | Kocznar |
| 5,706,614 A | 1/1998 | Wiley et al. |
| 5,727,352 A | 3/1998 | Bared et al. |
| 5,735,639 A | 4/1998 | Payne et al. |
| 5,983,578 A | 11/1999 | Huttie et al. |
| 6,102,228 A | 8/2000 | Rene |
| 6,155,747 A | 12/2000 | Payne et al. |
| 6,170,194 B1 | 1/2001 | Kocznar et al. |
| 6,205,200 B1 | 3/2001 | Boyer et al. |
| 6,299,008 B1 | 10/2001 | Payne |
| 6,513,670 B2 | 2/2003 | Minkkinen |
| 6,610,977 B2 | 8/2003 | Megerle |
| 6,724,304 B2 | 4/2004 | Risi |
| 6,742,301 B1 | 6/2004 | Schwarz |
| 6,745,520 B2 | 6/2004 | Puskaric et al. |
| 6,929,175 B2 | 8/2005 | Stockhammer |
| 6,972,693 B2 | 12/2005 | Brown et al. |
| 6,973,758 B2 | 12/2005 | Zeik |
| 6,983,567 B2 | 1/2006 | Ciotti |
| 7,023,339 B2 | 4/2006 | Stomski |
| 7,102,512 B2 | 9/2006 | Pendergraft |
| 7,119,682 B1 | 10/2006 | Fisher |
| 7,264,273 B2 | 9/2007 | Ryan |
| 7,343,762 B1 | 3/2008 | Slagel |
| 7,762,025 B2 | 7/2010 | Slagel |
| 7,823,338 B2 | 11/2010 | Slagel |
| 8,015,754 B2 | 9/2011 | Slagel |
| 2004/0227338 A1 | 11/2004 | Ryan |
| 2004/0232054 A1 | 11/2004 | Brown et al. |
| 2005/0074086 A1 | 4/2005 | Pendergraft |
| 2006/0107614 A1 | 5/2006 | Slagel |
| 2006/0150872 A1 | 7/2006 | Mesinger |
| 2008/0250726 A1 | 10/2008 | Slagel et al. |
| 2009/0107055 A1 | 4/2009 | Slagel |
| 2010/0315199 A1 | 12/2010 | Slagel |
| 2011/0011314 A1 | 1/2011 | Slagel |
| 2011/0289856 A1 | 12/2011 | Slagel |

FOREIGN PATENT DOCUMENTS

| | | |
|---|---|---|
| DE | 203 16 067 | 4/2004 |
| DE | 10 2004 048 403 | 4/2006 |
| DE | 20 2008 002 754 | 8/2008 |
| EP | 0 008 271 | 2/1980 |
| EP | 0 143 494 | 6/1985 |
| EP | 0 940 775 | 9/1999 |
| EP | 1 557 527 | 7/2005 |
| ES | 2 049 596 | 4/1994 |
| ES | 2 068 052 | 4/1995 |
| FR | 2 489 404 | 3/1982 |
| FR | 2 646 456 | 11/1990 |
| FR | 2 808 048 | 10/2001 |
| GB | 2 041 053 | 9/1980 |
| GB | 1 589 510 | 5/1981 |
| GB | 1 600 858 | 10/1981 |
| GB | 2 146 053 | 4/1985 |
| GB | 2 249 574 | 5/1992 |
| GB | 2 264 470 | 9/1993 |
| GB | 2 408 127 | 5/2005 |
| GB | 2 440 937 | 2/2008 |
| NL | 7 308 642 | 12/1974 |
| NL | 9301809 | 5/1995 |
| RU | 2 247 821 | 12/2003 |
| WO | WO 94/05879 | 3/1994 |
| WO | WO 96/30601 | 10/1996 |
| WO | WO 00/78129 | 12/2000 |
| WO | WO 06/055078 | 5/2006 |

OTHER PUBLICATIONS www.smithdetection.com; press release "Smiths Detection unveils innovative mobile security checkpoint for screening individuals and personal items"; Wiesbaden, Germany, Mar. 2, 2005.

www.smithsdetection.com; press release "Smiths Detection Creates First Mobile Security Screening Checkpoint in Partnership With TSWG and TSA PINE BROOK, N.J.", Pine Brook, N.J., Apr. 3, 2006.

www.wolfcoach.com; "Mobile Perimeter Checkpoint" brochure from L3 Communications (Wolf Coach) company's website; Apr. 2007.

www.miframsecurity.com/e/check_post.html; "Protected Screening Module" from Mifram Security Company's website, Apr. 7, 2005.

Employees' Compensation Case No. 699 of 2005, in the District Court of the Hong Kong Special Administrative Region, Oct. 5, 2006.

www.ascontainers.co.za/services.htm; A.S. Containers cc., 2007.

Brijot Imaging Systems, Inc., press release "Brijot Delivers First ScanPort™ Production Order to U.S. Army For Deployment in Middle East"; Orlando, Fla., May, 20, 2008.

International Search Report issued in Application No. PCT/US08/056503 dated Jul. 15, 2008.

Written Opinion issued in Application No. PCT/US08/056503 dated Jul. 15, 2008.

English language translation of NL 9 301 809, published May 16, 1995.

English language abstract of ES 2 068 052, published Apr. 1, 1995.
English language abstract of ES 2 049 596, published Apr. 16, 1994.
English language abstract of DE 10 2004 048 403, published Apr. 6, 2006.
English language abstract of FR 2 489 404, published Mar. 5, 1982.
English language abstract of RU 2 247 821, published Dec. 10, 2003.
English language abstract of EP 0 940 775, published Sep. 8, 1999.
English language abstract of FR 2 646 456, published Nov. 2, 1990.
English language abstract of DE 203 16 067, published Apr. 1, 2004.

(56) References Cited

OTHER PUBLICATIONS

English language abstract of FR 2 808 048, published Oct. 26, 2001.
English language abstract of BE 1 009 435, published Mar. 4, 1997.
English language abstract of EP 1557527, published Jul. 27, 2005.
English language abstract of EP 0008271, published Feb. 20, 1980.
International Preliminary Report on Patentability (IPRP) issued in PCT/US2008/056503 dated Oct. 22, 2009.
ISO Standards Handbook, Freight Containers, fourth edition 2006 (a CD copy of ISO Standards Handbook will follow via mail).
Plaintiff's Non-Infringement and invalidity Contentions served Dec. 1, 2015 in Civil Action No. 15-cv-01806.
Complaint for Declaratory Relief filed Aug. 20, 2015 in Civil Action No. 15-cv-01806.
Defendant www.Turnstiles.us, Inc.'s: Responses to Plaintiff's First Set of Interrogatories, Interrogatories 2-4, filed in Civil Case No. 16-cv-00455-PHX-DJH in the United States District Court for the District of Arizona filed Mar. 20, 2017 (12 pages).
Defendant www.Turnstiles.us, Inc.'s: Supplement to invalidity Contentions filed in Civil Case No. 16-cv-00455-PHX-DJH in the United States District Court for the District of Arizona filed on Mar. 13, 2017 (11 pages).
Defendant www.Turnstiles.us, Inc.'s: Invalidity Contentions filed in Civil Case No. 16-cv-00455-PHX-DJH in the United States District Court for the District of Arizona filed on Feb. 17, 2017 (5 pages).
Defendant www.Turnstiles.us, Inc.'s: Invalidity Contentions filed in Civil Case No. 16-cv-00455-PHX-DJH in the United States District Court for the District of Arizona filed on Mar. 3, 2017 (9 pages).
Related U.S. Appl. No. 10/992,126.
Related U.S. Appl. No. 11/733,464.
Related U.S. Appl. No. 12/818,899.
Related U.S. Appl. No. 12/889,861.
Related U.S. Appl. No. 14/157,011.
Related U.S. Appl. No. 13/205,419.
Related U.S. Appl. No. 14/735,130.
Related U.S. Appl. No. 15/192,344.

PORTABLE ACCESS CONTROL SYSTEM

CROSS-REFERENCE TO RELATED APPLICATIONS

This application is a continuation of U.S. application Ser. No. 15/621,517 filed Jun. 13, 2017 which is a continuation of U.S. application Ser. No. 15/192,344 filed Jun. 24, 2016 which is a continuation of U.S. application Ser. No. 14/735,130 filed Jun. 9, 2015, now U.S. Pat. No. 9,404,278, which issued on Aug. 2, 2016, which is a continuation of U.S. application Ser. No. 14/157,011 filed Jan. 16, 2014, now U.S. Pat. No. 9,051,748 which issued on Jun. 9, 2015, which is a continuation of U.S. application Ser. No. 13/205,419 filed Aug. 8, 2011, now U.S. Pat. No. 8,671,624 which issued on Mar. 18, 2014, which is a continuation of U.S. application Ser. No. 12/818,899 filed Jun. 18, 2010, now U.S. Pat. No. 8,015,754 which issued on Sep. 13, 2011, which is a continuation of U.S. application Ser. No. 10/992,126 filed Nov. 19, 2004, now U.S. Pat. No. 7,762,025 which issued on Jul. 27, 2010. The entirety of all of the above-listed applications are incorporated herein by reference.

FIELD OF THE INVENTION

The present invention is directed generally to access control systems and specifically to portable access control systems.

DESCRIPTION OF EMBODIMENTS OF THE INVENTION

The Containerized Access Control Unit

Figure 1:
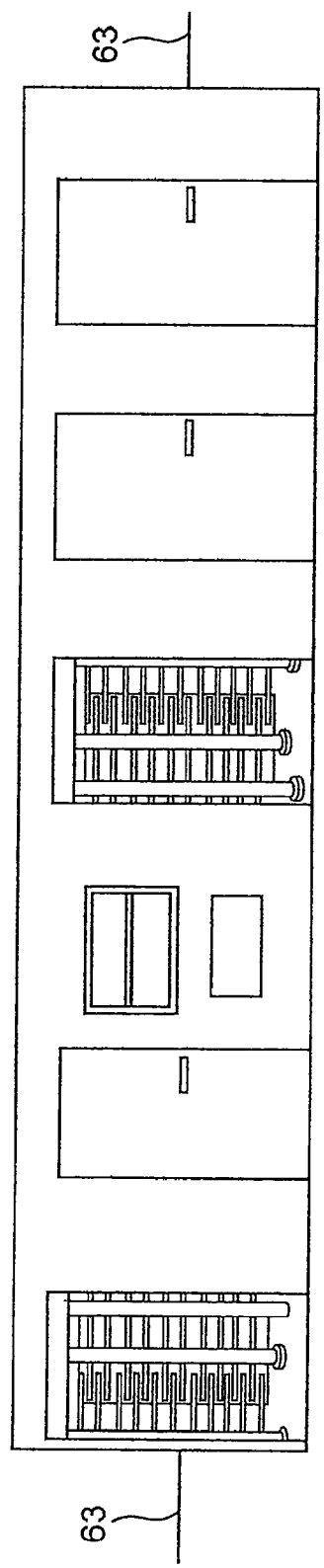
FIGS. 1 and 2 illustrate a front view and a perspective view of a portable container 110, according to embodiments of the invention.
Figure 2:
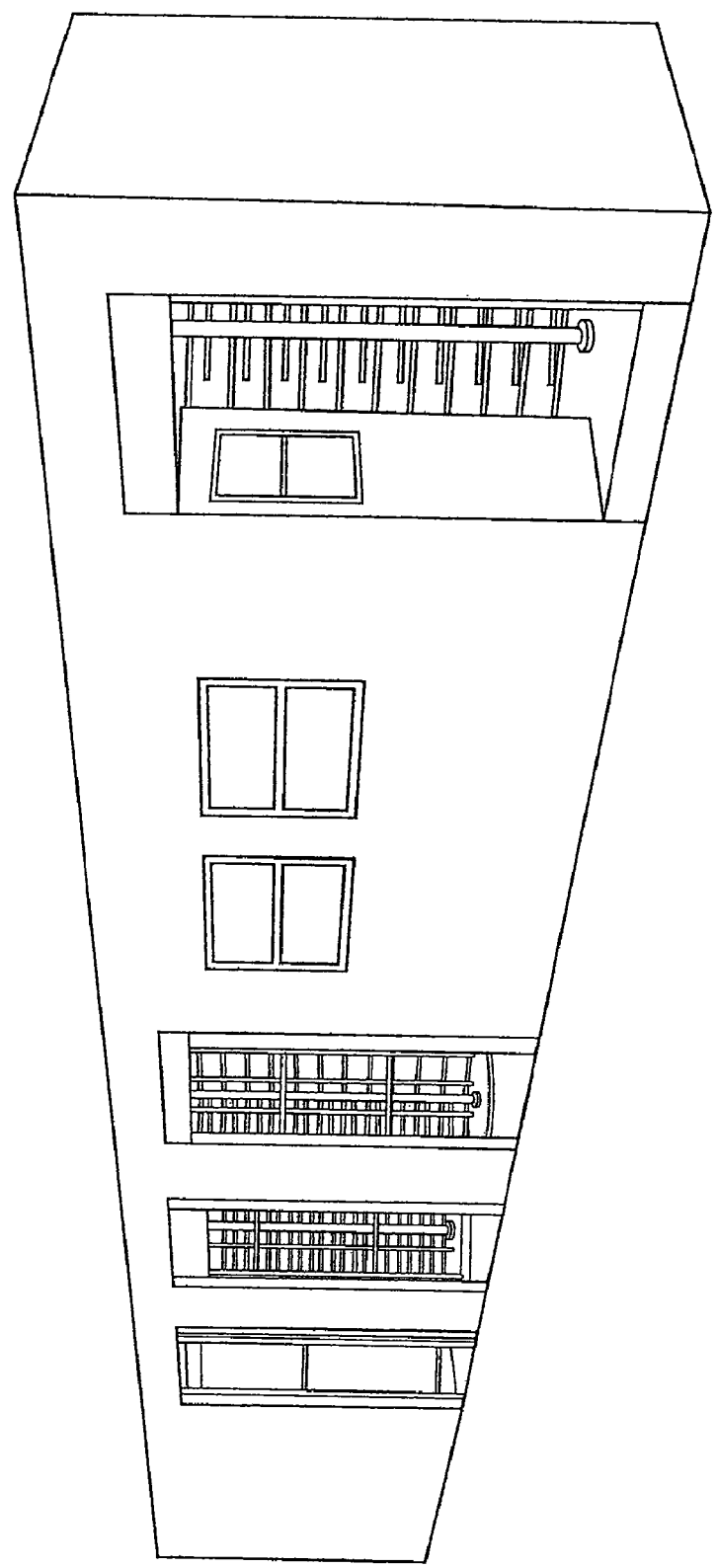

FIGS. 1 and 2 illustrate a front view and a perspective view of a portable container 110, according to embodiments of the invention. The portable container 110 has housing 20, which, in one embodiment, is rectangular shaped. However, any other shape is also possible. The housing 20 can be made of a durable material (e.g., iron, stainless steel), enabling the portable container 110 to be securely towed by a vehicle. One or both ends of the portable container 110 can be equipped to be towed by a vehicle. In addition, a security system to ensure that only authorized vehicles move the portable container 110 can also be included. Furthermore, fencing 63 or other material may be attached to the portable container 110 to surround a secured area 62 (e.g., see FIG. 5).

Figure 3:
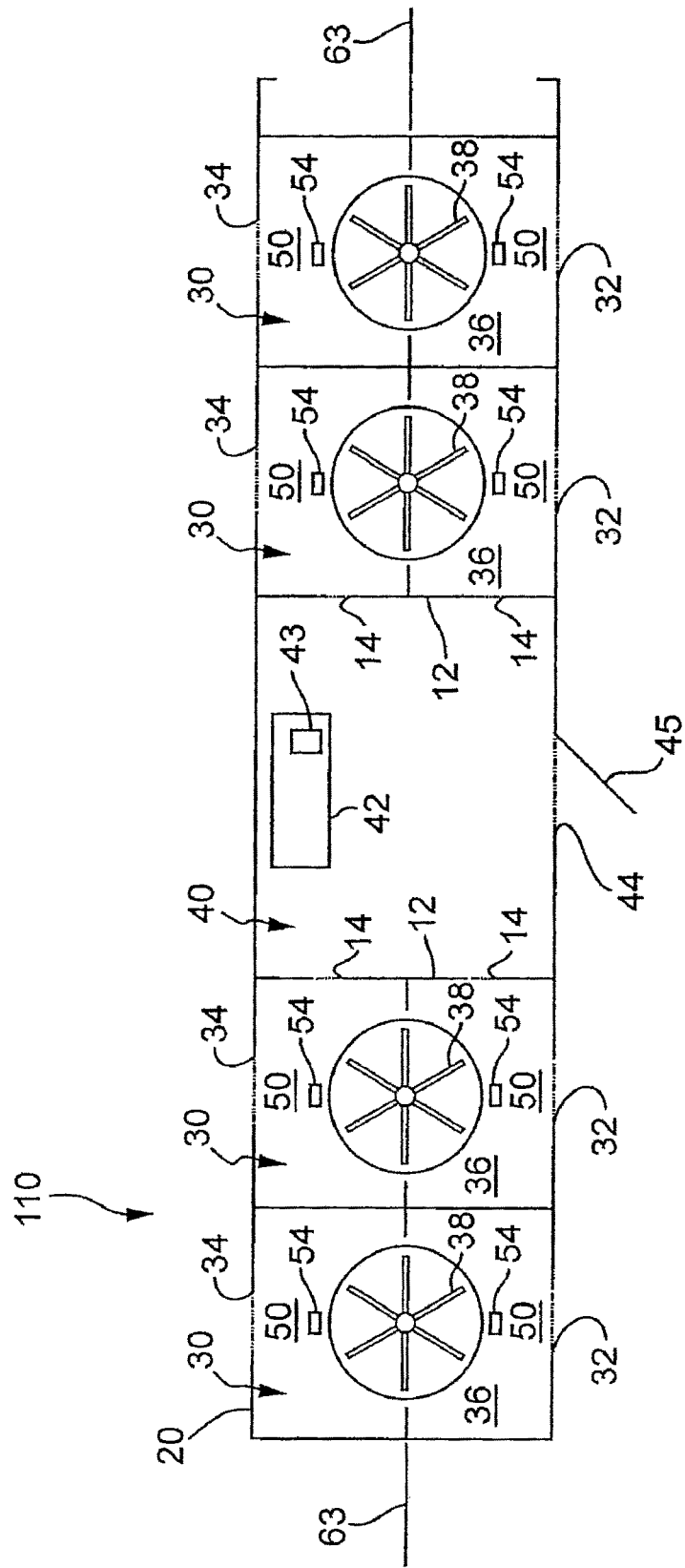
FIG. 3 illustrates a top cross-sectional view of the portable container 110, according to one embodiment of the invention.

FIG. 3 illustrates a top cross-sectional view of the portable container 110, according to one embodiment of the invention. The portable container 110 comprises at least one passing room 30, which is provided for controlling and directing the movement of people between two areas. In addition, the portable container 110 can also comprise at least one control room 40, for housing a guard or supervisor.

The portable container 110 can be a standard shipping container. In one embodiment, the standard shipping container can be a shipping container which complies with international standards as determined by the International Organization for Standardization (ISO). In one embodiment, the shipping container can include the following features: made from corrugated steel; heavy steel framed to withstand repeated lifting and placing; able to hold a cargo as large as 30 tons; marine grade plywood flooring; lockable accessible doors on one or both sides of the shipping container; forklift pockets; corner connectors; or a venting system; or any combination thereof.

In one embodiment, the portable container 110 can be delivered to a user in a ready-made or turn-key state. In this case, if electricity is not required, the portable container 110 is ready to be used. If electricity is required, all that needs to be done to render the portable container 110 usable is the provision of electricity. In another embodiment, the portable container can be customized by the user to meet specific needs of the user.

Figure 4:
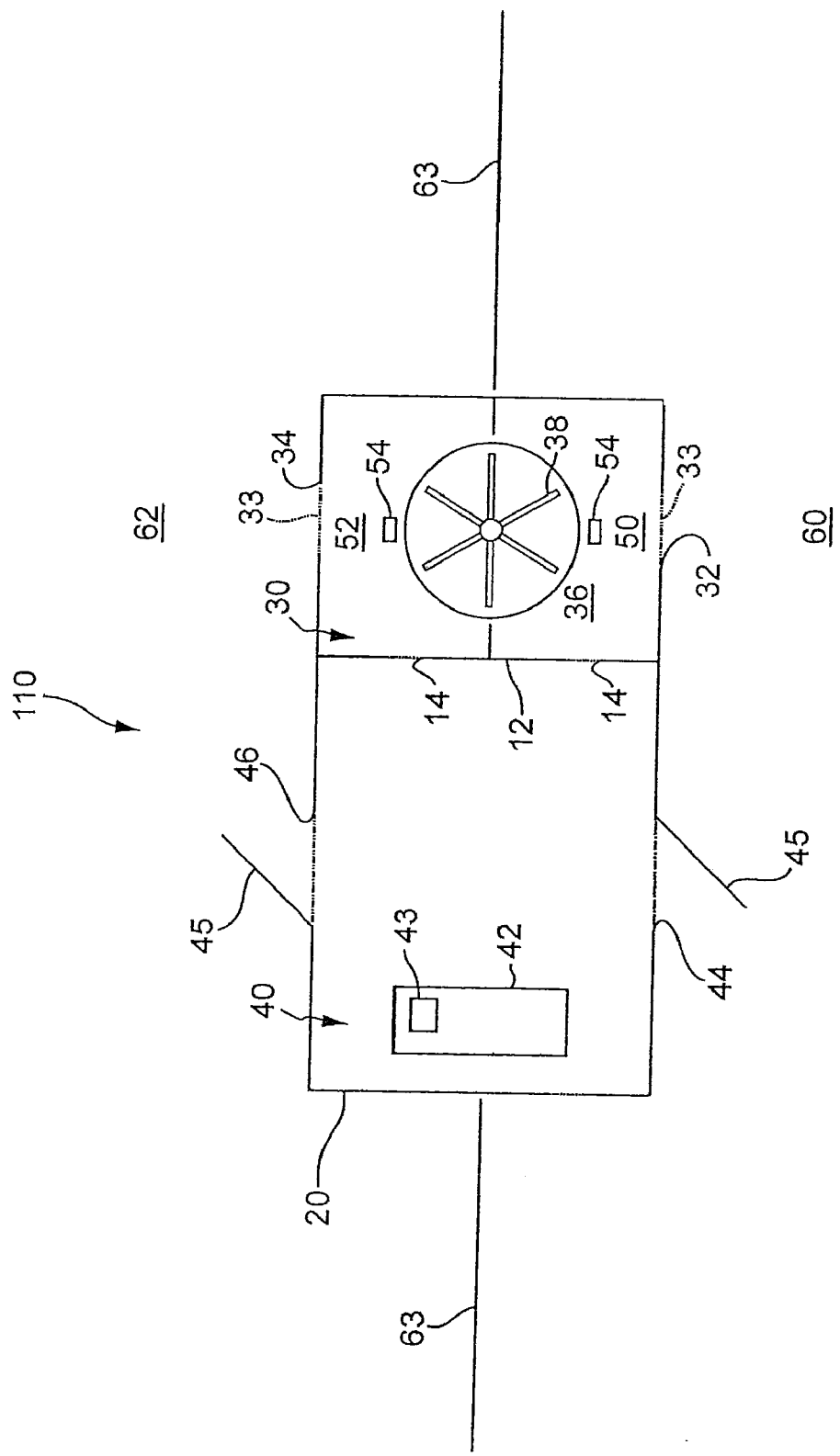
FIG. 4 is a detailed top cross-sectional view of a passing room 30 and a control room 40, according to one embodiment of the invention.

FIG. 4 is a detailed top cross-sectional view of a passing room 30 and a control room 40, according to one embodiment of the invention.

Passing Room. The passing room 30 controls the movement of people between area 60 and another area 62. A fence 63 can also be used to separate areas 60 and 62 in locations where the portable containers 110 are not used. The passing room 30 has at least a first opening 32, and at least a second opening 34, which in one embodiment is on a side opposite the first opening 32. However, the first opening 32, second opening 34, and additional openings can be located on any side of the passing room 30, including being located on the same side of the passing room 30. The second opening 34 is spaced apart from the first opening 32 so as to define a walkway 36 in-between. A closing device 33 (e.g., a door, shutters) is employed to close the openings 32 and 34 when passing room 30 is not in use. A security sensing device for safeguarding the closing device 33 can be employed.

The portable container 110 can comprise at least one barrier device 38 in the inside of the passing room 30, which restricts a person's movement through the passing room 30. In one embodiment, a turnstile (e.g., a full-body turnstile, a partial-body turnstile, a bi-directional turnstile, or a uni-directional turnstile) is employed as a barrier device of the portable container 110, but other barrier device may be used to restrict a person's movement through the passing room 30. For example, a sliding door, a revolving door, moving bars, and gates may be used as a barrier device. The barrier device 38 is located inside the walkway 36, defining a first space 50 between the barrier device 38 and the first opening 32, and defining a second space 52 between the barrier device 38 and the second opening 34.

In one embodiment, the passing room 30 can alternatively include at least one security device 54 issuing permission for a person to pass through the passing room 30. In one embodiment, the security device 54 can comprise, but is not limited to, one or more card readers, metal detectors, biometric readers, iris scanners, fingerprint or palm readers, explosive detectors, physical or facial recognition technology, electronic key locks, or mechanical key locks, or any combination thereof. The security device 54 can also include a security measure, such as, but not limited to, posting an individual proximate to the barrier device 38 to check identification cards (e.g., photo identification cards, licenses). In one embodiment, a security device 54 is located in the first space 50 and also in the second space 52. Security devices 54 can be included inside or outside of the passing room.

The passing room 30 can also comprise lighting.

Control Room. In one embodiment, a control room 40 is provided for housing a guard or supervisor. The control room 40 can include a control panel 42 to control the barrier device(s) 38 and the security device(s) 54 in order for a guard or supervisor to monitor the passing room while staying in the control room 40. The control panel 42 can comprise an alarm device 43 which gives an alarm in case a problem occurs in the passing room 30.

The control room 40 and the passing room 30 are separated by at least one wall 12. The wall 12 can comprise at least one window 14, so that a guard in the control room 40 can observe the inside of the passing room 30 or the outside of the portable container 110. The control room 40 has at least one opening 44 with at least one closing device 45. The closing device(s) 45 of the control room 40 can be the same as, or different from, the closing device(s) 33 of the passing room 30.

The control room 40 can also comprise: heat and/or air-conditioning; lighting; at least one computer/cable outlet; at least one phone jack; at least one electrical outlet; at least one vent; or insulation; or any combination thereof.

Figure 5:
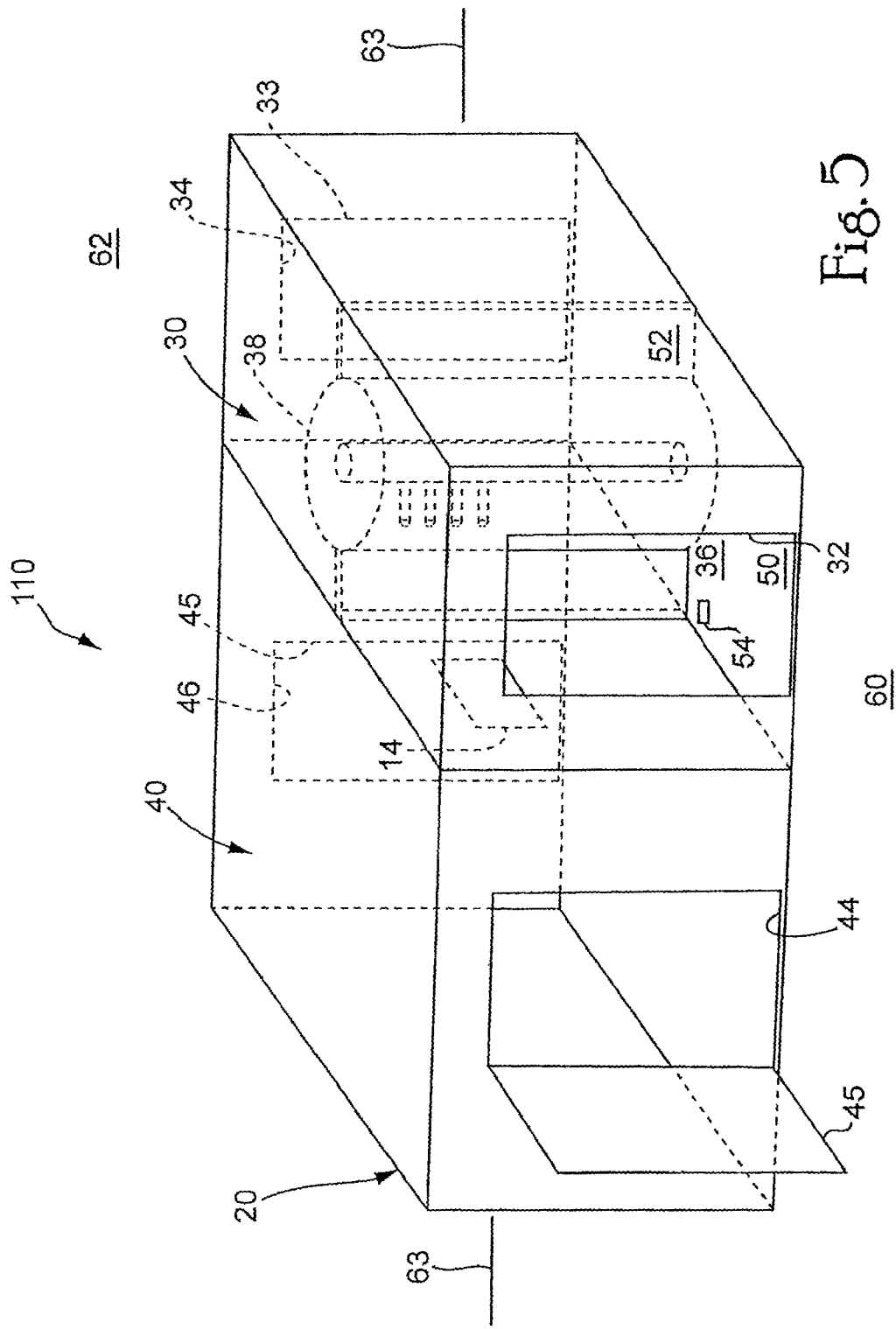
FIG. 5 illustrates a perspective view of a passing room 30 and a control room 40, according to one embodiment of the invention.

FIG. 5 illustrates a perspective view of a passing room 30 and a control room 40, according to one embodiment of the invention. As the portable container 110 has a housing 20 which comprises both the at least one passing room 30 and the at least one control room 40, it is easy for users to move and use almost anywhere. The portable container has everything that a user needs to control access to an area.

Use of the Containerized Access Control Unit

The portable container 110 can be put on a vehicle or trailer and transported or towed to reach multiple destinations, and can be used to control access to an area. The portable container may be used by people who have an access device (e.g., people working on a construction site). The access device is read by the security device. The portable container 110 may also be used by people that do not have an access device, but who must pass through security to enter a venue (e.g., an outside concert).

Use with Access Device. If the portable container 110 is being used in conjunction with an access device, when a person approaches the passing room 30 from an area 60 and enters the first opening 32, the person can stay in the first space 50 in the walkway 36 and present an access device (e.g., identification or electronically read card) to the security device 54. In one embodiment, because the security device 54 is located inside the passing room, the chance that the person will lose or break an identification card or device is decreased because the person does not need to expose the identification card or device outside of the portable container 110. The portable container 110 also protects the security device 54, because the security device 54 is located inside of the passing room 30.

In one embodiment, the barrier device remains locked or closed until the access device is successfully read by the security device 54. Once a person is approved by the security device 54, the barrier device 38 is unlocked and the person can go through the barrier device 38. If a person is not approved by the security device 54, the barrier device 38 continues to be kept locked, and, the control panel 42 can give an alarm to a guard via the alarm device 43.

Use without Access Device. If the portable container 110 is being used without an access device, when a person approaches the passing room 30 from an area 60 and enters the first opening 32, the person can stay in the first space 50 in the walkway 36 and go through the security device 54 (e.g., a metal detector). In one embodiment, the barrier device 38 can be the same device as the security device 54 (e.g., the metal detector). In another embodiment, a separate barrier device can be used to stop persons from accessing the secured area 62. The barrier device 38 remains locked or closed until the security device 54 or security personnel authorizes a person to enter the secured area 62. Once a person is approved, the barrier device 38 is unlocked and the person can go through the barrier device 38. If a person is not approved, the barrier device 38 continues to be kept locked, and, the control panel 42 can give an alarm to a guard via the alarm device 43. Alternatively, the barrier device can remain open until locked by security personnel, for example.

Manufacturing of the Containerized Access Control Unit

In one embodiment, a standard shipping container is filled with material to be shipped at a first location. Then, the container is shipped to a second location. The container is next unloaded at the second location. Next, the container is outfitted as an access control unit after the container is unloaded. In one embodiment, the second location can be overseas from the first embodiment.

CONCLUSION

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments.

In addition, it should be understood that the figures, which highlight the functionality and advantages of the present invention, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

The invention claimed is:

1. An access control system, comprising:
   a portable container comprised of durable material enabling the portable container to withstand repeated relocation of the portable container, and wherein the container is configurable such that a bottom surface of the container sits on a surface between the first area and the second area to prevent access to the second area from the first area;
   at least one passing room disposed in the portable container, the at least one passing room having at least a first passing room opening that provides access to the portable container from a first area adjacent one side of the portable container, and at least a second passing room opening that provides access from the portable container to a second area adjacent a second side of the portable container, and a walkway in-between, wherein a floor of the at least one passing room spans between the first area and the second area;

at least one turnstile located in the at least one passing room, defining a first space between the at least a first passing room opening and the at least one turnstile, and a second space between the at least one turnstile and the at least a second passing room opening, the at least one passing room and the at least one turnstile requiring passage through the at least one turnstile to proceed from the at least a first passing room opening to the at least a second passing room opening; and at least one electronic control coupled to the at least one turnstile so that the at least one electronic control causes the at least one turnstile to permit or block passage through the at least one turnstile to thereby prevent unauthorized access from the first area into the second area;

wherein the at least one passing room provides at least one path for each passing room from the at least a first passing room opening, to the at least one turnstile, to the at least a second passing room opening.

2. The access control system of claim 1, wherein the at least one passing room contains the at least one electronic control, which is electronically coupled to the at least one turnstile to provide authorization for a person to pass through the at least one turnstile.

3. The access control system of claim 2, wherein the at least one electronic control includes one or more card readers, one or more metal detectors, one or more biometric readers, one or more iris scanners, one or more fingerprint readers, one or more facial recognition technology, one or more explosive detectors, one or more electronic key locks, or one or more mechanical key locks, or a combination of two or more thereof.

4. The access control system of claim 1, further comprising enclosing material to separate the first area adjacent the at least a first passing room opening from the second area adjacent the at least a second passing room opening, the container being disposed adjacent to the enclosing material.

5. The access control system of claim 1, further comprising at least one control room.

6. The access control system of claim 5, wherein the at least one control room includes at least one control panel which controls the at least one electronic control to enable a person to monitor the at least one passing room from the at least one control room.

7. The access control system of claim 5, wherein a wall is provided between the at least one passing room and the at least one control room, the wall including at least one window.

8. The access control system of claim 1, wherein the container is delivered in a turnkey state.

9. The access control system of claim 1, wherein the at least one electronic control is located outside the at least one passing room.

10. The access control system of claim 1, wherein the at least one passing room provides a substantially linear path from the at least a first passing room opening to the at least a second passing room opening.

11. A method of controlling passage, comprising:
monitoring persons who are desiring to pass through a portable container comprised of durable material enabling the portable container to withstand repeated relocation of the portable container, and wherein the container is configurable such that a bottom surface of the container sits on a surface between the first area and the second area to prevent access to the second area from the first area, the container including at least one passing room, the at least one passing room having at least a first passing room opening that provides access to the portable container from a first area adjacent one side of the portable container and at least a second passing room opening that provides access from the portable container to a second area adjacent a second side of the portable container and a walkway in-between, wherein a floor of the at least one passing room spans between the first area and the second area, and at least one barrier device located in the at least one passing room, defining a first space between the at least a first passing room opening and the at least one barrier device, and a second space between the at least one barrier device and the at least a second passing room opening, wherein the at least one passing room provides at least one path for each passing room from the at least a first passing room opening, to the at least one barrier device, to the at least a second passing room opening, the at least one passing room and the at least one barrier device requiring passage through the at least one barrier device to proceed from the at least a first passing room opening to the at least a second passing room opening; and selectively enabling, via at least one electronic control coupled to the at least one barrier device, passage through the at least one barrier device, based on the monitoring, wherein the at least one electronic control causes the at least one barrier device to permit or block passage through the at least one barrier device to thereby prevent unauthorized access from the first area into the second area.

12. The method of claim 11, wherein the first passing room opening and the second passing room opening are located on opposite sides of an enclosing material.

13. The method of claim 11, further comprising controlling ingress and egress between the first area and the second area via at least one control area disposed in the container adjacent to the at least one passing room.

14. The method of claim 13, wherein the controlling comprises authorizing entry of a person into the second area.

15. The method of claim 13, wherein the controlling comprises monitoring the at least one passing room.

16. The method of claim 13, wherein the controlling comprises controlling the at least one barrier device so as to authorize or deny passage therethrough.

17. The method of claim 11, wherein a substantially linear walkway is provided between the at least a first passing room opening and the at least a second passing room opening.

18. An access system, comprising:
a portable structure comprised of durable material enabling the structure to withstand repeated relocation of the structure, and wherein the structure is configurable such that a bottom surface of the structure sits on a surface between the first area and the second area to prevent access to the second area from the first area;

at least one passing area in the structure, the at least one passing area having at least a first passing area opening that provides access through the portable structure from a first area adjacent one side of the structure, and at least a second passing area opening that provides access from the portable structure to a second area adjacent a second side of the structure, and a pathway, wherein a floor of the at least one passing area spans between the first area and the second area;

at least one barrier device in the pathway, defining a first space between the at least a first passing area opening and the at least one barrier device, and a second space between the at least one barrier device and the at least a second passing area opening, the at least one passing area and the at least one barrier device requiring passage through the at least one barrier device to proceed from the at least a first passing area opening to the at least a second passing area opening; and at least one electronically controlled security device coupled to the at least one barrier device so that the at least one electronically controlled security device causes the at least one barrier device to permit or block passage through the at least one barrier device to thereby prevent unauthorized access from the first area into the second area;

wherein the at least one passing area provides at least one path for each passing area from the at least a first passing area opening, to the at least one turnstile, to the at least a second passing area opening.

19. An access control system, comprising:

a portable container comprised of durable material enabling the portable container to withstand repeated relocation of the portable container, and wherein the container is configurable such that a bottom surface of the container sits on a surface between the first area and the second area to prevent access to the second area from the first area;

at least one passing area disposed in the container, the at least one passing area having at least a first passing area opening that provides access to the portable container from a first area adjacent one side of the portable container, and at least a second passing area opening that provides access from the portable container to a second area adjacent a second side of the portable container, and a pathway, wherein a floor of the at least one passing area spans between the first area and the second area; and at least one barrier device located in the pathway, defining a first space between the at least a first passing area opening and the at least one barrier device, and a second space between the at least one barrier device and the at least a second passing area opening, the at least one passing area and the at least one barrier device requiring passage through the at least one barrier device to proceed from the at least a first passing area opening to the at least a second passing area opening;

at least one electronic control coupled to the at least one barrier device so that the at least one electronic control causes the at least one barrier device to permit or block passage through the at least one barrier device to thereby prevent unauthorized access from the first area into the second area;

wherein the at least one passing area provides at least one path for each passing area from the at least a first passing area opening, to the at least one barrier device, to the at least a second passing area opening.

20. A method of controlling passage, comprising:

monitoring persons who are desiring to pass through a portable structure comprised of durable material enabling the portable structure to withstand repeated relocation of the portable structure, and wherein the structure is configurable such that a bottom surface of the structure sits on a surface between the first area and the second area to prevent access to the second area from the first area, the structure including at least one passing area, the at least one passing area having at least a first passing area opening that provides access to the portable structure from a first area adjacent one side of the portable structure and at least a second passing area opening that provides access from the portable structure to a second area adjacent a second side of the portable structure and a pathway between the at least a first passing area opening and the at least a second passing area opening, wherein a floor of the at least one passing area spans between the first area and the second area and at least one turnstile located in the pathway, defining a first space between the at least a first passing area opening and the at least one turnstile, and a second space between the at least one turnstile and the at least a second passing area opening, wherein the at least one passing area provides at least one path for each passing area from the at least a first passing area opening, to the at least one turnstile, to the at least a second passing area opening, the at least one passing area and the at least one turnstile requiring passage through the at least one turnstile to proceed from the at least a first passing area opening to the at least a second passing area opening; and selectively enabling, via at least one electronic control coupled to the at least one turnstile, passage through the at least one turnstile, based on the monitoring, wherein the at least one electronic control causes the at least one turnstile to permit or block passage through the at least one turnstile to thereby prevent unauthorized access from the first area into the second area.

21. An access control system, comprising:

a portable container comprised of durable material enabling the portable container to withstand repeated relocation of the portable container, and wherein the container is configurable such that a bottom surface of the container sits on a surface between the first area and the second area to prevent access to the second area from the first area;

at least one passing room disposed in the portable container, the at least one passing room having at least a first passing room opening that provides access to the portable container from a first area adjacent one side of the portable container, and at least a second passing room opening that provides access from the portable container to a second area adjacent a second side of the portable container, and a walkway in-between, wherein a floor of the at least one passing room spans between the first area and the second area;

at least one barrier device located in the passing room, defining a first space between the at least a first passing room opening and the at least one barrier device, and a second space between the at least one barrier device and the at least a second passing room opening, the at least one passing room and the at least one barrier device requiring passage through the at least one barrier device to proceed from the at least a first passing room opening to the at least a second passing room opening; and at least one electronic control coupled to the at least one barrier device so that the at least one electronic control causes the at least one barrier device to permit or block passage through the at least one barrier device to thereby prevent unauthorized access from the first area into the second area;

at least one control area including at least one control panel, wherein the at least one control panel controls the at least one electronic control to enable a person to monitor the at least one passing room from the at least one control area;

wherein the at least one passing room provides a path for each passing room from the at least a first passing room opening, to the at least one barrier device, to the at least a second passing room opening;

wherein the at least one passing room contains the at least one electronic control, which is electronically coupled to the at least one barrier device to provide authorization for a person to pass through the at least one barrier device; and wherein the at least one electronic control includes one or more card readers, one or more metal detectors, one or more biometric readers, one or more iris scanners, one or more fingerprint readers, one or more facial recognition technology, one or more explosive detectors, one or more electronic key locks, or one or more mechanical key locks, or a combination of two or more thereof.

* * * * *